US007451119B2

(12) United States Patent
Elliot et al.

(10) Patent No.: US 7,451,119 B2
(45) Date of Patent: Nov. 11, 2008

(54) SYSTEM AND METHOD OF IDENTIFYING AND SORTING INTERNATIONAL MAIL PIECES BASED ON APPLIED-POSTAGE ADEQUACY IN ORDER TO ENHANCE POSTAL SERVICE REVENUE PROTECTION

(75) Inventors: Russell Elliot, Endicott, NY (US); Audrey Ferry, Vestal, NY (US); Jeffrey S. Poulin, Endicott, NY (US); Linda H. Rockwood, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/913,726

(22) Filed: Aug. 6, 2004

(65) Prior Publication Data

US 2005/0065898 A1 Mar. 24, 2005

Related U.S. Application Data

(60) Provisional application No. 60/493,668, filed on Aug. 8, 2003.

(51) Int. Cl.
*G06F 17/00* (2006.01)

(52) U.S. Cl. ........................ 705/401; 705/402; 705/404

(58) Field of Classification Search ........................ None
See application file for complete search history.

(56) References Cited

U.S. PATENT DOCUMENTS

| | | | | |
|---|---|---|---|---|
| 4,349,891 | A | 9/1982 | Uchimura et al. | |
| 5,019,991 | A | 5/1991 | Sansone et al. | |
| 5,308,932 | A * | 5/1994 | Manduley et al. | 177/25.15 |
| 5,452,654 | A * | 9/1995 | Connell et al. | 101/91 |

(Continued)

FOREIGN PATENT DOCUMENTS

WO WO 02/074456 A3 9/2002

OTHER PUBLICATIONS

InternetWeek, Back to Reality: Postal Service Reboots E-Biz, Aug. 13, 2001, http://www.internetweek.com/newslead01/lead081301.htm?Is=TW_070202_fea.*

(Continued)

*Primary Examiner*—John W Hayes
*Assistant Examiner*—Rob Wu
(74) *Attorney, Agent, or Firm*—Louis J. Franco; Leland D. Schultz

(57) ABSTRACT

Provided is a method of reducing postal revenue losses associated with the processing and delivery of international mail pieces. Algorithmically-resolved image data associated with a mail piece is compared to international-mail-services postage data and a determination is rendered, based on the comparison, as to whether any postage indicated as paid is sufficient to further process the mail piece in accordance with the level of delivery service requested. In various aspects, an attempt to algorithmically ascertain the identity of the sender is undertaken for purposes of automated charge assessment relative to a mail piece for which it is determined that insufficient postage has been tendered. In accordance with alternative aspects, if the sender identity cannot be ascertained, the mail piece is variously (i) rejected for manual handling or (ii) routed for automated sortation and delivery in accordance with a "downgraded" delivery service level for which the amount paid is adequate.

2 Claims, 7 Drawing Sheets

U.S. PATENT DOCUMENTS

| | | | | |
|---|---|---|---|---|
| 5,535,127 | A * | 7/1996 | Uno et al. | 705/406 |
| 5,774,554 | A * | 6/1998 | Gilham | 380/51 |
| 5,794,222 | A | 8/1998 | Wakabayashi et al. | |
| 5,819,239 | A * | 10/1998 | Berson et al. | 705/403 |
| 6,032,138 | A * | 2/2000 | McFiggans et al. | 705/410 |
| 6,064,995 | A * | 5/2000 | Sansone et al. | 705/410 |
| 6,834,273 | B1 * | 12/2004 | Sansone et al. | 705/410 |
| 2004/0093312 | A1 * | 5/2004 | Cordery et al. | 705/401 |
| 2004/0122779 | A1 * | 6/2004 | Stickler et al. | 705/402 |
| 2004/0128254 | A1 * | 7/2004 | Pintsov et al. | 705/62 |

OTHER PUBLICATIONS

Information Week, Click-And-Mail Services Cancel Post-Office Hassles, Jul. 24, 2000, http://www.informationweek.com/796/prpostage.htm.*

Postage Meters and PC Postage Systems, 024 Quick Service Guide, Jun. 2003.*

* cited by examiner

FIG. 1C
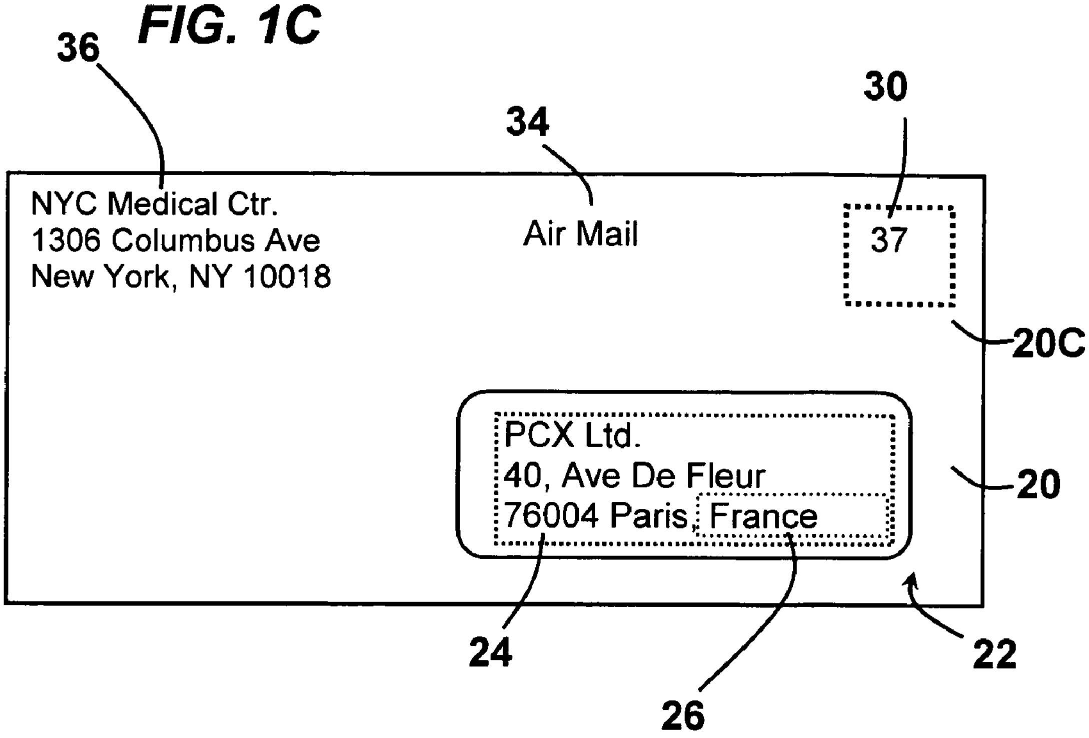
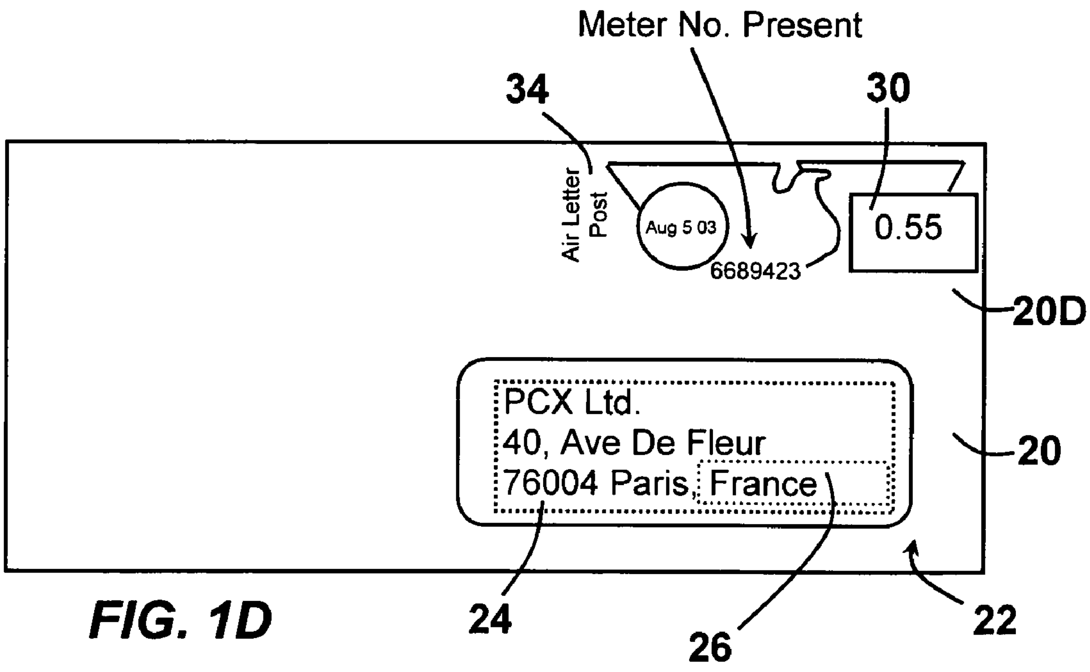
FIG. 1D

| Dest. Nation | Mail Piece Type | Weight | Airmail Letter Post | . | . | Global Express Guaranteed | Global Express Mail | Global Priority Mail | Surface Regular |
|---|---|---|---|---|---|---|---|---|---|
| FRANCE | Letter | 0-1.0oz | $.60 | . | . | . | . | . | . |
| | | 1.0<2.0 | $.85 | . | . | . | . | . | . |
| | | 2.0<3.0 | $1.10 | . | . | . | . | . | . |
| | | ...... | ....... | .. | . | . | . | . | . |
| | | .5<1.0 lb. | . | . | . | $33.00 | $16.25 | $8.00 | . |
| | | 1.0<2.0lb. | . | . | . | $38.00 | $17.00 | ..... | . |
| | | | . | . | . | . | . | . | . |
| | ..... | .... | . | . | . | . | . | . | . |
| | Flat | .... | . | . | . | . | . | . | . |
| | | 10<11oz | . | . | $.70 | . | . | . | . |
| | | 11<12oz | . | . | $.85 | . | . | . | . |
| | | . | . | . | . | . | . | . | . |
| | ..... | . | . | . | . | . | . | . | . |
| | Package | .5<1.0lb. | . | . | . | $42.00 | $27.00 | $9.50 | $3.25 |
| | | 1.0<2.0lb. | . | . | . | $47.00 | $33.00 | $13.40 | $4.10 |
| | | 2.0<3.0lb. | . | . | . | . | . | . | . |
| | | . | . | . | . | . | . | . | . |
| | | | | | | | | | |
| | | | | | | | | | |
| | | | | | | | | | |
| | ..... | | | | | | | | |
| | | | | | | | | | |
| | | | | | | | | | |

160

*FIG. 3* Entries in an Illustrative International Postage-Rate Database

| Postage Meter No. | Postal Customer's Account ID | Customer Name | Street Address Postal Code | Street No and name | City | State | Account Auto Bill enabled |
|---|---|---|---|---|---|---|---|
| 6689423 | 003001 | Beacon Hill Co. | 02110 | 14 Beacon Street | Boston | MA | 1 |
| 6689427 | 003016 | State Street Safe Co. | 02109 | 600 State Street | Boston | MA | 1 |
| 6689438 | 014732 | Hartford Securities | 06456 | 200 Main Street | East Hartford | CT | 1 |
| . . . . | . . . . . . | . . . . . . | . . . . . . | | | | |
| 6756172 | 006789 | Georgetown Univ. Hosp. | 20229 | 1298 Ohio Street, SE | Washington | D.C. | 0 |
| 6756177 | 007812 | NJ Transport Co. | 07749 | 140 Redbrick Ave | Elizabeth | NJ | 0 |
| | | . . . . . . . | | | | | |
| . . . . | 009832 | Yale Univ. | 06211 | 420 K St. | New Haven | CT | 1 |
| | | . . . . . . . | | | | | |
| . . . . | | | | | | | |
| . . . | | . . . . . | | | | | |

*FIG. 5* Illustrative File in Postal Customer Account Database 175

SYSTEM AND METHOD OF IDENTIFYING AND SORTING INTERNATIONAL MAIL PIECES BASED ON APPLIED-POSTAGE ADEQUACY IN ORDER TO ENHANCE POSTAL SERVICE REVENUE PROTECTION

PROVISIONAL PRIORITY CLAIM

Priority based on Provisional Application Ser. No. 60/493,668, filed Aug. 8, 2003, and entitled "SYSTEM AND METHOD OF IDENTIFYING AND SORTING INTERNATIONAL MAIL PIECES BASED ON APPLIED-POSTAGE ADEQUACY IN ORDER TO ENHANCE POSTAL SERVICE REVENUE PROTECTION," is claimed.

BACKGROUND

An international mail piece originating in the United States is deposited with the United States Postal Service at, for example, a local post office branch from which it is then routed to an appropriate one of a plurality of outgoing international mail centers, each of which mail centers services a specified geographic region or "zone" of the United States for purposes of handling both outgoing and incoming international mail. There exist approximately 13 zones in the United States and each is serviced by an international mail center that is generally located at or near one of the major U.S. international airports. For instance, there is an international mail center located at or near each of JFK airport in New York, LAX airport in Los Angeles and O'Hare International airport in Chicago.

Although an international mail piece could be deposited directly at an outgoing international mail center, it is typically received into the system at a local post office branch. Mail received into the postal system at a local branch office is eventually transported to a centralized postal hub. There are in excess of 250 postal hubs in the United States. These "hubs" are known by alternative names including (i) processing and distribution centers, (ii) general mail facilities and (iii) mail distribution centers. Postal hubs are regional mail centers that handle incoming and outgoing mail for individual post office branches within a particular range of ZIP Codes. Typically, a postal hub services one or more "three-digit ZIP Code areas." For example, the Central Massachusetts Processing and Distribution Center (also known as the "Worcester Facility") services the local post office branches situated in all the ZIP Codes beginning with "014", "015," "016," and "017." That is, mail destined for or departing from a local branch office within a ZIP Code beginning with any one of the four sets of three digits in the previous sentence will, under normal circumstances, pass through the Worcester facility. The Worcester facility services more than two dozen towns, each with its own local branch office. Nationally, the 250 plus hubs collectively service approximately five thousand individual postal branch offices.

Domestic mail coming into and going out of the various local branch offices in a particular geographic region is processed through one or more hubs before delivery to its final domestic destination. Mail pieces identified as international mail pieces are transported from a regional hub to an international mail center such as the mail centers described above. Each international mail center services a plurality of regional hubs.

International mail arriving at a regional hub or an international mail center is currently randomly sampled to ascertain whether senders are applying the required postage. As part of the random sampling process, heavy reliance is placed on manual handling and visual inspection by human personnel. One basis upon which random sampling may be conducted is when it comes to the attention of postal personnel that a single sender, such as corporation, is sending large quantities of overseas mail. If it is determined that the sender has applied inadequate postage on some predetermined threshold quantity of mail pieces, personnel remove the sender's mail pieces from automated sortation apparatus and quantify the total amount of the postage deficiency for all of the identified mail pieces in order to render postal charge assessment to the sender.

It will be appreciated that, although the measures described above identify and render charge assessment against some senders that underpay for postage, a large percentage of underpaid mail pieces go undetected and are transported and delivered at a loss to the postal system. The cost of human labor renders prohibitive reliance upon human inspection to detect a large percentage of underpaid mail pieces. Analogous processes and similar losses are implemented and incurred by the postal systems of countries other than the United States.

Accordingly, there exists a need for an enhanced, automated method of identifying and processing international mail pieces that (i) bases automated sorting decisions at least in part on a machine-executed algorithmic determination of the adequacy of applied postage and that, consequently, reduces reliance on costly human labor and error and (ii) enables automated postal-charge assessment to a postal customer who has underpaid the postage required to process a mail piece as desired.

SUMMARY

Various implementations of the invention are concerned with automated methods of properly identifying international mail pieces for which adequate postage has not been paid based on predetermined criteria and, furthermore, to sort international mail pieces to designated collection points in accordance with a pre-established protocol including a set of sortation rules as part of an automated sortation process. Adapting and employing automated mail sortation apparatus to identify and sort international mail according to the adequacy of applied postage substantially reduces manual handling and the cost and potential for errors associated therewith, as well as the loss of revenue associated with the delivery of underpaid or unpaid international mail pieces. Illustrative examples of criterion factored into a determination of applied-postage adequacy include (i) international destination, (ii) mail-piece type (e.g., letter, flat or package), (iii) mail piece weight, and (iv) service-type requested (e.g., regular, first class, second, third class, fourth class, priority, express, certified, and/or recipient signature required). The term "service-type" is, for purposes of various implementations described in the specification and claimed, regarded as interchangeable with "level of service," "level of delivery service" and other variations thereof. The term "international destination" as used throughout the specification and claims indicates governmental and other entities to which a set of distinctive postal rates applies and may include, for example, territories and possessions. In addition, "international destination" may also refer to a region of a large country, such as the United States, that includes multiple "zones" that are regarded as separate international destinations, for example. For instance, relative to a mail piece originating in London, the zone of the United States serviced by the international mail processing facility associated with Chicago's O'Hare International Airport is regarded as a different "international destination" than the zone of the United States serviced by the international mail processing facility associated with New York's JFK airport.

As is more fully explained further in this specification, various implementations disparately treat different types of international mail pieces depending on a predetermined potential for revenue loss associated with a particular mail piece type. For instance, in one implementation, less intensive automated address interpretation resources are allocated for ascertaining the identity of a sender of a letter bearing inadequate postage than the sender of a package bearing inadequate postage because, from a statistical standpoint, a greater loss of revenue is likely to be associated with the latter. Such an implementation executes a preconceived assessment that, in a realm of finite resources, it is statistically more cost effective to forego a postage shortfall of perhaps several cents associated with a letter than a shortfall of perhaps several dollars associated with a package, for example.

In order for automated interpretation apparatus to determine whether adequate postage has been tendered for delivery of an international mail piece and how the mail is to be routed for delivery, information exhibited on at least one surface of the mail piece is conveyed to automated interpretation apparatus through mail-piece data acquisition apparatus. The data acquisition apparatus may include, for example, one or more cameras or optical character recognition (OCR) scanners. Although data may be acquired from a mail piece by alternative methods, the act of mail-piece data acquisition is principally expressed throughout the specification and claims in terms of "image capturing" or "image acquisition." Therefore, it is intended that "image capturing" and "image acquisition," and semantic variations thereof, be interpreted sufficiently broadly to include alternative methods of automated data acquisition such as photography and scanning. Accordingly, various implementations include capturing or acquiring at least one image of a surface of the mail piece and storing the at least one image in computer memory. Depending on whether it is desired to preserve the capacity to re-associate the at least one image with the physical mail piece to facilitate future handling, alternative aspects include the steps of marking the physical mail piece with a unique identification mark representing its identity and storing a computer memory record of the identification mark in association with the at least one stored image acquired from a surface of the mail piece.

The at least one captured image acquired from the mail piece is resolved by interpretation algorithms to produce a resolved data set associated with the corresponding physical mail piece and is indicative of at least the nation for which the mail piece is destined as indicated in the destination address field, whether any postage-paid indication is exhibited on the mail piece and, in various implementations, the amount of postage actually paid by the sender. The resolved data set may also include indications as to the service-type (e.g., mail class, priority, express, etc.) and, perhaps, weight exhibited on the mail piece. An indication on the mail piece as to an amount of postage paid may include (i) a mailing label downloaded and printed from an on-line postage vendor in a manner known to those of ordinary skill in the relevant art, (ii) postage-paid indicia printed by a postal clerk at a postal service branch office or even (iii) a generic, self-adhesive stamp purchased at a postal service office branch.

In various implementations, weight of an international mail piece is an important factor is determining whether a sender of the mail piece has applied adequate postage. As previously indicated, a textual indication as to the weight of a mail piece may appear on the surface of a mail piece. However, such indications are not regarded as standard practice and to rely on a stated indication of weight, even in the relatively rare instances in which one may appear, presents the potential for lost revenue due to mistakes or intentional understatements of weight by senders. Accordingly, various embodiments include an in-line scale among the automated sortation machinery for weighing mail pieces. In some versions, a machine-registered weight indication is associated with the resolved data set corresponding to a physical mail piece. Alternative versions facilitate manual data entry of a mail-piece weight by, for example, a postal employee and the association of that inputted data with the data set associated with the corresponding physical mail piece.

Mail-piece dimensions are, in various implementations, yet an additional factor that is associated with a resolved data set and accounted for in the determination as to whether adequate postage has been paid for the delivery of an international mail piece corresponding thereto. Mail-piece-dimension data is rendered, for instance, by at least one of (i) manual data entry by a postal employee, (ii) the data output of mail-piece-dimension sensing apparatus, (iii) and an indication exhibited on the mail piece and having resolved image data corresponding thereto. Mail-piece dimension sensing apparatus are known to those possessing ordinary skill in the automated postal processing art and, in various extant devices, include optical sensors relying on emitted signals reflected off a mail piece and into one or more signal receivers. As is known, it is possible to derive dimensional data from one or more captured images as well. Typically, for a mail piece exhibiting three substantial dimensions (e.g., a box or mailing tube as opposed to a flat or letter), at least two captured images from at least two different angles are required in order to render calculated dimensional data.

Various implementations include the maintenance of machine-accessible international-mail-services postage data relating required-postage rates to various predetermined mail-piece characteristics selected from a set of mail-piece characteristics including (i) international destination, (ii) mail-piece type (e.g., letter, flat or package), (iii) mail piece weight, (iv) mail-piece dimensions, and (v) service-type requested (e.g., mail class including, for instance, priority, express, registered, certified, insured and signature-request services etc.). In various embodiments, this information is maintained in an international-postage-rate database that includes one or more tariff tables. A sortation protocol includes a set of revenue-protection rules including subsets of conditions indicative as to where a mail piece corresponding to a resolved data set is to be routed by automated sorting machinery based on the satisfaction, by the resolved data set, of at least one subset of conditions. Of primary importance, in various aspects, is a comparison between the amount of postage actually paid, as indicated by the resolved data set, and the amount of postage required for the mail piece as indicated by the maintained international-mail-services postage data.

The international-mail-services postage data is consulted and the resolved data set is compared to the international-mail-services postage data in accordance with the sortation protocol in order to ascertain whether one or more subsets of conditions is satisfied by the resolved data set. Based on the satisfaction of one or more condition subsets, a resultant sortation signal set corresponding to sortation and routing of the associated physical mail piece to a designated mail piece collection point is generated and rendered accessible to predetermined, signal-responsive automated sorting machinery. In various aspects, a determination is rendered, based on the comparison between the resolved data set associated with the mail piece and the international-mail-services postage data, as to whether any postage indicated as paid by data within the resolved data set is sufficient to further process the mail piece in accordance with the level of delivery service requested.

The sortation decisions particular to a specific implementation can vary from those of alternative implementations. An illustrative implementation sorts mail pieces to collection point types, or "selections," selected from among a set of four potential selection types, by way of non-limiting example. For instance, an international mail piece for which the corresponding resolved data set indicates that at least the required amount of postage has been paid is routed to a collection point for mail pieces to be "sent as requested." Also routed to a "send-as-requested"-type collection point, in some implementations, are mail pieces to which a predetermined minimum of postage required for the international destination has been applied, regardless of at least one of the actual weight and dimensions of the mail piece. This may be done if, for example, either of the weight and dimension characteristics of the mail piece is unavailable. For example, a letter, as opposed to a flat or package, bearing the required minimum postage for the lowest weight category (e.g., up to 1.0 ounce) for the international destination may be sent as requested regardless of the actual weight of the letter. Such an implementation executes a judgment that, on average, underpayment of postage on letters does not represent as great a source of revenue loss as underpayment of postage on packages or flats and that it is, therefore, not cost effective to allocate resources for the collection of letter postage shortfalls. A "send-as-requested" collection point receives mail pieces for which the postage actually applied, though less than the postage actually required, is inadequate by an amount within a predetermined "inadequacy threshold," which is alternatively referred to as a "deficiency threshold." For instance, consider a package bound for Japan for which the postage required is $35.00. If the amount of postage actually applied by the sender is $34.50, and the particular version tolerates an inadequacy of up to 3% (i.e., $1.05), for example, a decision is rendered to route the package for delivery as if full postage had been paid. Such tolerance within an inadequacy threshold balances the needs of the postal system to collect revenue and obviate inordinate amounts of handling to collect a relatively small sum of money with the needs of customers to avoid draconian consequences (i.e., refused delivery) for postage shortfalls that are deemed, as defined by the inadequacy threshold, insignificant or even unintentional. A fourth category of mail pieces collected at a send-as-requested collection point includes mail pieces exhibiting information to which the identity of a corresponding postal customer can be matched for purposes of automated charge assessment for "postage balances due" and/or a surcharge for additional handling and as a deterrent to future postage deficiencies. Exhibited customer identifying information may include, by way of non-limiting example, an indication of at least one of (i) a meter number, (ii) a postal services account number, and (iii) a postal-customer mailing address. The postal-customer mailing address in the context of customer (e.g., sender) identifying information would typically be a return address, such as the sender's residence address or other address at which the sender receives mail.

At a second selection type, mail pieces for which the postage actually applied is inadequate for the service requested are collected for transport and delivery in accordance with a level of service for which the postage actually applied is adequate. For example, if a customer places contents in a "global express" package for which the required postage is $25.00 and affixes only $15.00 in postage, the package is routed for delivery in accordance with the "best level" of delivery service for which $15.00 is sufficient (e.g., "global priority" requiring $12.50) or some other "lesser" level of service.

A third collection point type collects mail pieces for which at least the presence of a return address has been verified and the mail pieces so collected are returned to the corresponding senders for lack of adequate postage.

The illustrative implementation includes a fourth selection type designated for "rejected" mail pieces that do not meet the criteria for automated sortation to any of the other implemented collection points. Such mail pieces may be manually handled and, for instance, sent by lowest cost method to the destination address indicated (e.g., ship instead of aircraft). Alternatively, such mail pieces may be manually examined for exhibited information that reveals the identity of the sender for purposes of postal charge assessment or return to the sender.

Representative implementations are more completely described and depicted in the following detailed description and the accompanying drawings.

BRIEF DESCRIPTION OF THE DRAWINGS

FIGS. 1A, 1B, 1C and 1D depict four illustrative international mail pieces;

FIG. 3 is an illustrative portion of an international-postage-rate database;

FIG. 5 is of an illustrative in a postage-meter account database.

DETAILED DESCRIPTION

The following description of international mail sortation processes and architecture, and various implementations thereof, is demonstrative in nature and is not intended to limit the invention or its application of uses. For purposes of explanation, consideration is given to the movement and sortation of four illustrative international mail pieces.

Referring to FIGS. 1A through 1D and 2, the international mail pieces 20, individually designated as 20A, 20B, 20C and 20D, are received into a postal system and processed through at least one outgoing-mail center 100. As described previously in the background, an international mail piece 20 is typically processed through more than one mail center 100, one of which is an international mail center. In reading the following description, it is to be understood that different processing operations or functions, such as those depicted in FIG. 2, may occur at different mail centers 100 relative to any particular mail piece 20. For example, an international mail piece 20 may be weighed, measured and digitally photographed at a regional, non-international mail center 100 and not finally sorted to a collection point until it is at an outgoing-international-mail center 100. Accordingly, it is to be understood that the reference in FIG. 2 to "outgoing mail center 100" is generic and should therefore not be interpreted as necessarily limiting the operations, functions and processes described to a single processing facility.

Figure 1A:
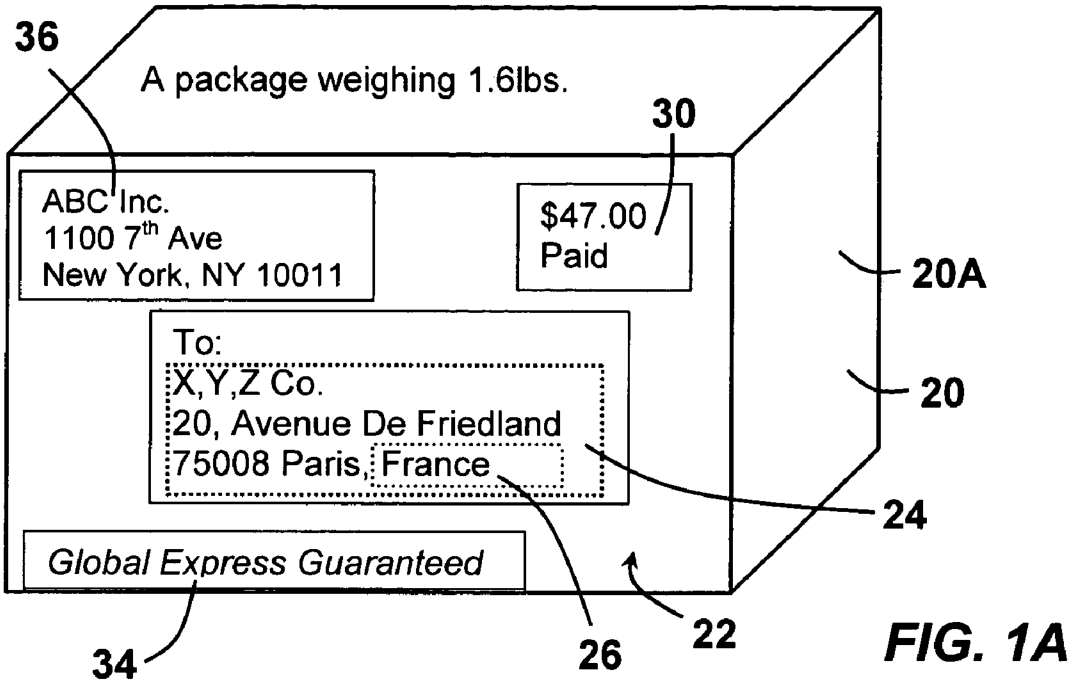
Figure 1B:
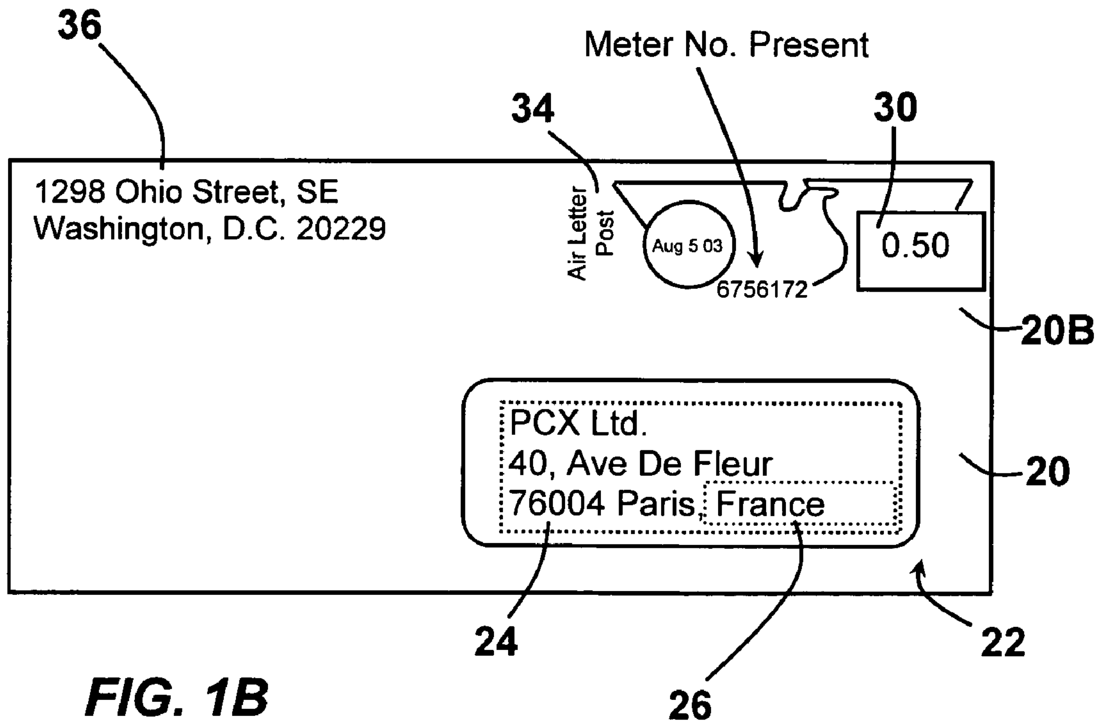

Each international mail piece 20 includes a surface 22 having a delivery address field 24 including an international destination 26. The remainder of an address field 24 includes more specific information that is required by the foreign incoming-international-mail center (not shown) in order to further route the mail piece 20 through a local delivery branch office to an addressee and may include street, building, apartment or house number, addressee information and a postal code. The mail pieces 20A, 20B, 20C and 20D are identifiable as international mail pieces 20 and variably exhibit on their surfaces 22 a postage-paid indicium 30, a service-type request 34 and a return address 36. In the case of metered mail, the postage-paid indicium 30 typically includes a unique meter number associated with the sender of the mail piece 20, as shown in FIGS. 1B and 1D. The unique meter number provides data useable by interpretation algorithms in positively identifying a sender so that the mail piece 20, if underpaid, can be returned or, in various embodiments, to whom charges for postage deficiencies can be automatically charged without return of the physical mail piece 20. However, as previously indicated, the physical mail piece 20 susceptible to processing through the at least one mail center 100 may not be associated on its face with a meter number and, in fact, may include as a postage-paid indicium 30 only a stamp that has not, like a meter number, or other exhibited account number, been pre-associated with a sender's identity. The service-type request 34 may assume various alternative forms including, for example, indicia pre-printed for the postal service and imprinted on mail piece envelopes, boxes, tubes or jackets or labels to be applied to mail pieces by senders. Familiar examples of such indicia for United States domestic mail include Express Mail labels and envelopes, priority mail envelopes and labels and certified mail labels that include a number and bar code. A United States domestic Express Mail label, for instance, includes a unique tracking number and bar code identifying the mail piece to which it is applied as Express Mail. Analogous indicia exist for international mail services. A letter in a plain envelope addressed to a foreign country is accorded a level of service analogous to first class mail in the United States.

Figure 2:
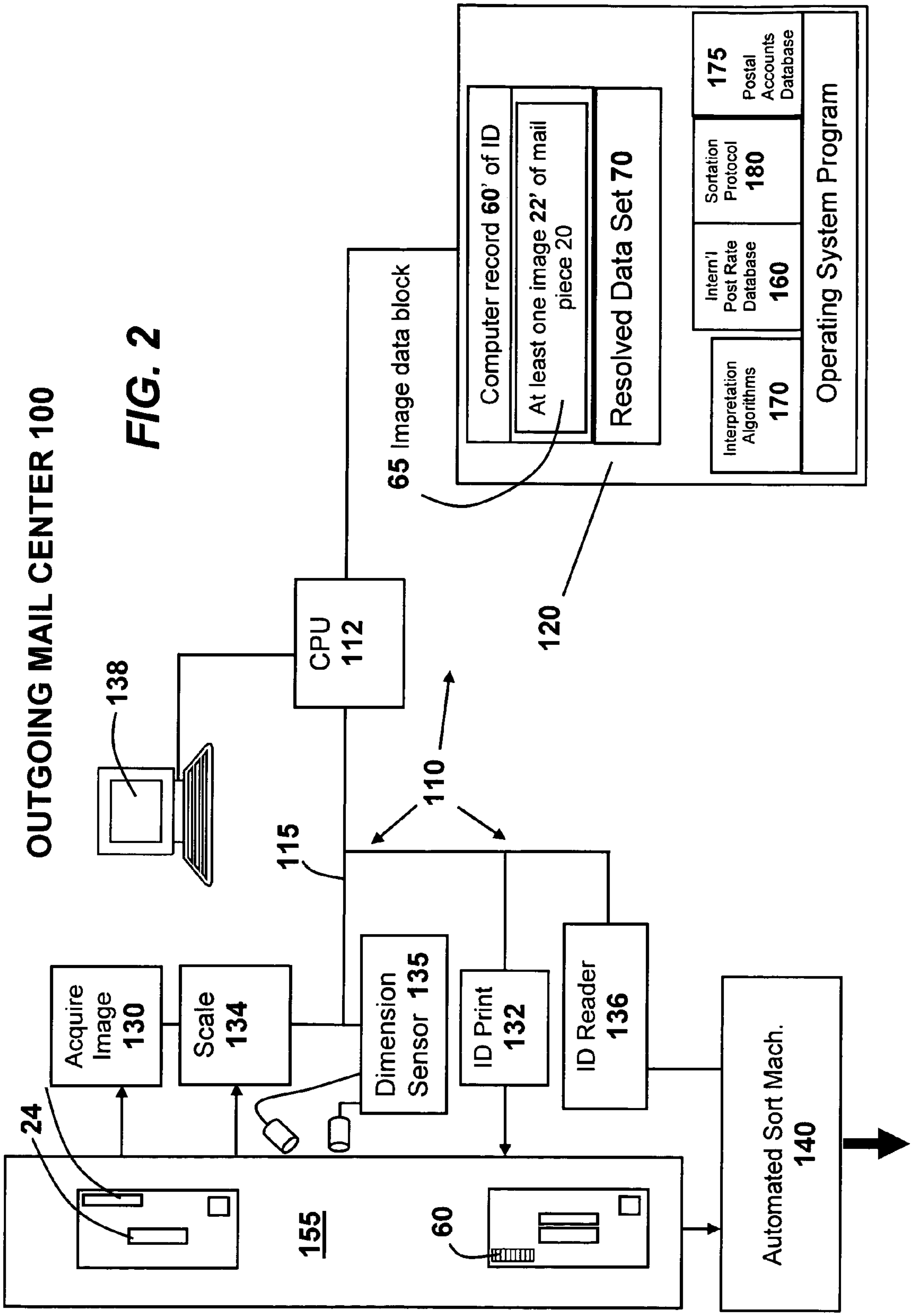
FIG. 2 is a schematic block diagram of an outgoing-mail center and architecture accessible to at least one outgoing mail center for the movement of an international mail piece and postal charge assessment associated therewith.
Figure 2:
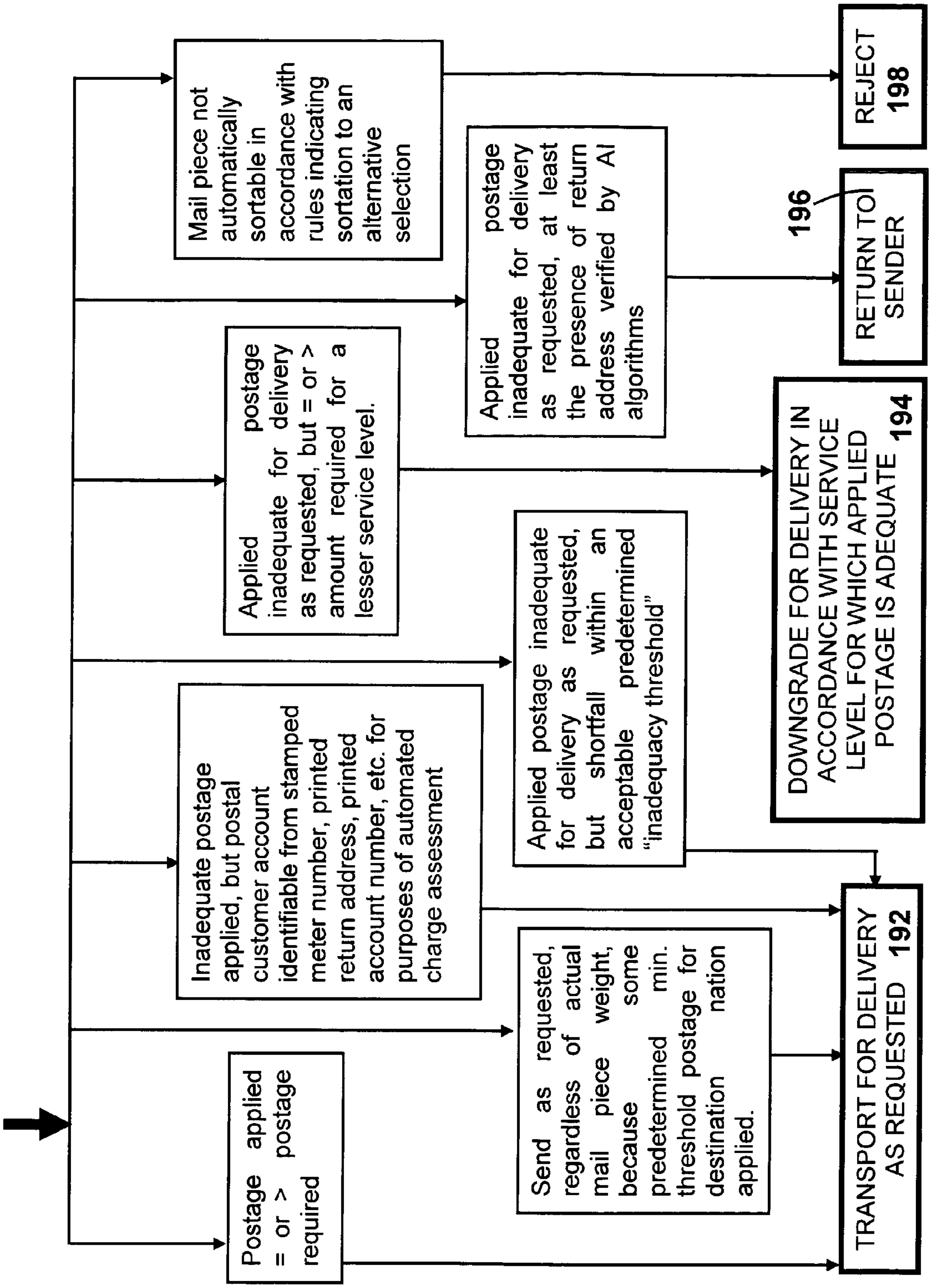

FIG. 2 is a function-block diagram of the architecture at, and accessible to, the illustrative outgoing-mail center 100. The outgoing-mail center 100 includes access to a data processing system 110, which may be at least partially located outside of the outgoing-mail center 100. The data processing system 110 includes a central processing unit (CPU) 112 that is communicatively linked via a communications link 115 to a memory 120, image acquisition apparatus 130, a printer 132, a mail-piece scale 134 and an identification-mark reader 136. The system architecture further includes automated sorting machinery 140 responsive to computer-generated sortation signals.

At the outgoing-mail center 100 of FIG. 2, an international mail piece 20 is deposited on a conveyor 155, where it is conveyed passed the image acquisition apparatus 130. The image acquisition apparatus 130 scans and captures at least one image 22' of the surface 22 of the physical mail piece 20 and stores each captured image 22' as a two-dimensional bit plane of pixels, for example, in memory 120. A unique identification mark 60 is associated with the captured image(s) 22' and a computer memory record 60' of the unique identification mark 60 is stored in conjunction therewith in an image data block 65 corresponding to the physical mail piece 20. Typically, the identification mark 60 comprises a bar code, for example. A printer 132 prints the unique identification mark 60 on the physical mail piece 20. The unique identification mark 60 allows the corresponding captured image(s) 22' to be accessed and, when necessary, re-associated with the corresponding physical mail piece 20. The captured image(s) 22' include image data representative of the destination address field 24 and other, aforementioned information exhibited on the physical mail piece 20, for example. In addition to the acquisition of image data from a mail piece 20, weight data is acquired by the mail-piece scale 134 for each mail piece 20 of a selected set of mail pieces 20 and is associated in memory 120 with the computer memory record 60' of the unique identification mark 60 corresponding to the physical mail piece 20. As indicated in the summary, mail-piece-weight data may be provided and associated with other data corresponding to the physical mail piece 20 by apparatus and methods other than a mail-piece scale 134. For example, mail-piece-weight data may be manually entered by a postal employee through a computer terminal 138 or and indication of weight may be provided on the mail piece 20. It is to be understood that none of these methods of acquiring mail-piece-weight data is exclusive and that two or more methods may be implemented in the processing of a single mail piece 20.

As explained in the summary, various implementations factor mail-piece dimensions into the determination as to whether adequate postage has been paid for the delivery of an international mail piece corresponding thereto. As with mail-piece-weight data, mail-piece-dimension data is rendered, for instance, by at least one of (i) manual data entry by a postal employee through a computer terminal 138, (ii) the data output of mail-piece-dimension sensing apparatus 135, (iii) and an indication exhibited on the mail piece and having resolved image data corresponding thereto and included in the resolved data set 70.

While the international mail piece 20 to which a set of stored images 22' and weight and dimension data, if applicable, corresponds is still at an outgoing-mail center 100, or in transit between two outgoing mail centers 100, interpretation algorithms 170 resolve (or interpret) at least enough image data to ascertain the international destination for which the mail piece 20 is destined and to generate sortation signals for the sorting machinery 140 to route the mail piece 20 to an appropriate collection point for loading onto a transport vehicle at the outgoing-mail center 100. As image data is resolved, a resolved data set 70 is formed and associated with the computer memory record 60' of the unique identification mark 60.

In various implementations, an international-postage-rate database 160 is provided for maintaining international-mail-services postage data accessible to the outgoing-mail center 100. The international-postage-rate database 160 contains data relating required-postage rates to various predetermined international mail-piece characteristics selected from a set of mail-piece characteristics including, for example, (i) international destination, (ii) mail-piece type (e.g., letter, flat or package), (iii) mail-piece weight, (iv) mail piece dimensions and (v) service-type requested (e.g., mail class including, for instance, priority or express services). FIG. 3 shows a portion of the data that appears in an illustrative international-postage-rate database 160. The maintenance of an international-postage-rate database 160 containing data accessible to interpretation algorithms 170 and automated sorting machinery 140 at the outgoing-mail center 100 facilitates the accurate sortation of international mail pieces 20 based on the adequacy of applied postage.

Figure 4:
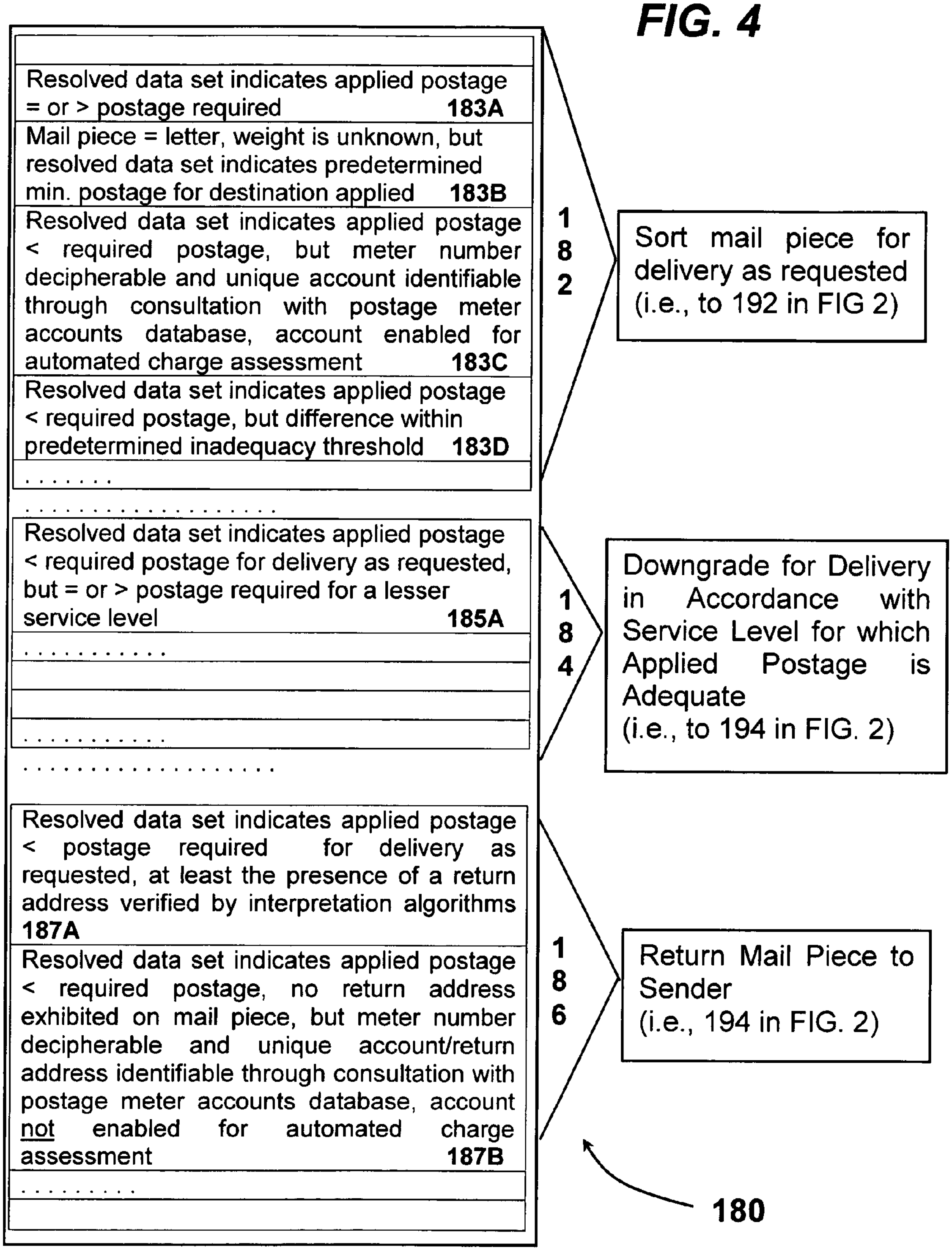
FIG. 4. shows an illustrative portion of a sortation protocol file including condition sets and condition subsets, the satisfaction of any of which by a resolved data set associated with a mail piece corresponds to the generation of a set of sortation instructions directing the corresponding mail piece to a predetermined collection point.

In addition to the maintenance of a international-postage-rate database 160, a sortation protocol 180 provides a basis for instructing automated sortation apparatus (e.g., automated sorting machinery 140) as to how a particular international mail piece 20 is to be sorted based on consultation with the international-postage-rate database 160 and comparison of data therein with a resolved data set 70 associated with the mail piece 20. Referring to FIGS. 4 and 2, an illustrative sortation protocol 180 includes a first condition set 182 including condition subsets 183A, B, C and D, a second condition set 184 including illustrative condition subset 185A and a third condition set 186 including condition subsets 187A and B. The illustrative sortation protocol 180 is structured such that the first condition set 182 corresponds to sortation of the corresponding mail piece 20 to an "as-requested" collection point 192 at the outgoing-mail center 100 from which it will be transported to the foreign incoming-international-mail center for delivery as requested. Condition subsets 183A through D within the first condition set 182 are constructed such that the satisfaction of even a single one of condition subsets 183A through D within the illustrative protocol 180 corresponds to automated sortation of a mail piece 20 whose resolved data set 70 satisfies any of condition subsets 183A through D to an appropriate as-requested collection point 192.

The illustrative second condition set 184 corresponds to sortation to a "downgrade" collection point 194 to which mail pieces 20 lacking postage sufficient for delivery as requested are sent for delivery in accordance with a lesser service level for which the applied postage is adequate. Satisfaction of a condition subset 185A within the second condition set 184 by the resolved data set 70 associated with a mail piece 20 results in the generation of sortation signals indicating that the automated sorting machinery 140 direct the mail piece 20 to a downgrade collection point 194.

The third condition set 186 of the illustrative sortation protocol 180 corresponds to sortation of mail pieces 20 to a "return-to-sender" collection point 196 based on the satisfaction by the resolved data set 70 associated with a mail piece 20 of one of the condition subsets 187A and 187B within the second condition set 186.

It will be appreciated that the illustrative condition subsets 183A-D, 185A and 187A and 187B of, respectively, condition sets 182, 184 and 186 depicted in FIG. 4 represent a limited, demonstrative and non-limiting selection of numerous possible condition subsets 183, 185, and 187. Moreover, as suggested in the summary, still additional condition subsets that, for example, do not fall under any of the preceding three condition sets 182, 184 and 186, correspond to the sortation of mail pieces 20 to a "reject" collection point 198 as shown in FIG. 2.

Referring to FIGS. 2 and 5, various implementations facilitate automated postal charge assessment for postage deficiencies to postal accounts identifiable through automated data-set resolution. One manner in which a postal account associated with a sender can be identified is through resolution of a meter number from a mail piece 20. Moreover, there exist postal customer accounts corresponding to customers other than those associated with metered-mail accounts through which a sender may by identifiable. Accordingly, various implementations include access by interpretation algorithms 170 to a postal-customer account database 175 which, in various aspects, is a machine-consultable repository for maintaining postal-customer account data uniquely relating the identity of each postal customer of a selected set of postal customers with data indicative of at least one of (i) a mailing address, (ii) a postal services account number and (iii) a postal meter number. FIG. 5 shows several entries in an illustrative postal-customer account database 175. The postal-customer account database 175 includes a postal customer account number, a customer name and a mailing address associated with each postage meter number. The postal-customer account database 175 of the illustrative implementation also includes an indication as to whether the customer's account is enabled for automated billing of postage deficiencies wherein "1" corresponds to enabled and "0" corresponds to non-enabled. As to metered mail pieces 20 lacking sufficient postage, for example, if a meter number is decipherable by interpretation algorithms 170, and the sender's account is enabled for automated charge assessment, the sender and the postal service are spared the consequences of returning the mail piece 20 to the sender and the postal service collects the appropriate postage for its services. In one alternative implementation, a surcharge is assessed for automated postage-deficiency charge assessment. In another example from the illustrative postal-customer account data of FIG. 5, Yale Univ. does not have associated with it a meter number, but automated billing is enabled for this postal customer, which is possible because, in the example, Yale Univ. has both a postal services account number (i.e., postal customer account ID) and a sender's mailing address (i.e., 420 K St., etc.) associated therewith in the postal-customer account database 175, although, in various implementations, either of these two items of identifying information may be sufficient to enable automated charge assessment.

In order to further facilitate understanding of the implementation and aspects depicted in FIGS. 2 through 5, reference is made to the international mail pieces 20 depicted in FIGS. 1A through 1D, and a brief explanation is provided as to how each of the four mail pieces 20A, B, C and D would be processed in the outgoing-mail center 100. For simplicity of explanation, all four mail pieces 20A, B, C and D are bound for Paris, France. Moreover, it is assumed that a complete resolved data set 70 corresponding to each of the four mail pieces 20A, B, C and D is available to, and resolvable by, interpretation algorithms 170.

Mail piece 20A is a package weighing 1.6 lbs. to which $47.00 in postage has been applied with a request for "Global Express Guaranteed" delivery service. The resolved data set 70 corresponding to mail piece 20A is compared to data included in the international-postage-rate database 160 in accordance with the sortation protocol 180. Referring to FIG. 3, the illustrative international-postage-rate database 160 indicates that, for a package bound for France, $47.00 in postage is required for Global Express Guaranteed Service if the package weighs between one and two pounds. Accordingly, mail piece 20A satisfies condition subset 183A of the sortation protocol 180 and is routed by automated sorting machinery 140 to collection point 192 for delivery as requested.

Mail piece 20B is a metered letter to which 50 cents postage has been applied. The international-postage-rate database 160 of FIG. 3 indicates that no less than 60 cents is ever sufficient for a letter bound for France. Accordingly, the applied postage is deficient and automated sorting machinery 140 requires an instruction as to how to route the mail piece 20B. Mail piece 20B includes a return address that does not directly identify the sender. However, it also includes a meter number (i.e., No. 6756172). Accordingly, the postal-customer account database 175 (FIG. 5) is consulted to ascertain the identity and return address of the postal customer to whom meter number 6756172 was assigned and whether the account is enabled for automated charge assessment. Referring to FIG. 5, meter number 6756172 is associated with Georgetown University Hospital and the account is not enabled for automated charge assessment. Accordingly, a set of instructions directing the mail piece 20B to a return-to-sender collection point 194 is generated.

Mail piece 20C is a stamped, non-metered letter bearing postage in the amount of 37 cents, an amount previously demonstrated as insufficient on a letter bound for France. There is no meter number, so the postal-customer account database 175 is not consulted. However, there is a complete return address. Accordingly, a set of instructions directing the mail piece 20C to a return-to-sender collection point 194 is generated and rendered accessible to the automated sorting machinery 140. It will be appreciated, based on previous descriptions of alternative implementations, that only in the particular example described above is the stamped, non-metered mail piece 20C routed for return to the sender. In alternative implementations, once a comparison between the resolved data set 70 associated with a mail piece 20 such as mail piece 20C and the international-mail-services postage data in the international-postage-rate database 160 indicates that any postage indicated as paid is insufficient to further process the mail piece (e.g., 20C) in accordance with the level of delivery service requested, the postal-customer account database 175 is consulted and the resolved data set 70 associated with the mail piece 20 is compared to data in the postal-customer account database 175 in order to determine, through cross-referencing, whether one of a unique postal customer account and a unique postal meter account is identifiable for purposes of automated charge assessment. Accordingly, for instance, consider, with reference to FIG. 5, a scenario in which Yale University places a generic 37 cent stamp on a letter that it addresses to an intended recipient in France, and that it also includes its return address, but not its postal customer account ID on the envelope. In such a case Yale's account number could be identified though consultation with, and cross-referencing within, the postal-customer account database 175 based in resolved data indicative of Yale's return address. Furthermore, because, in the example, Yale University has opted to enable the automated billing option, as indicated by the "1" in the last column of the illustrative data table, automated postal-charge assessment could be executed against account number 009832, as long as the return address portion of the captured image of the envelope were resolvable and associated with the resolved data set 70 associated with the mail piece 20. It will be appreciated, based on the foregoing, that while metered mail may involve a pre-association (e.g., prior to deposit of a mail piece into the postal system) between a customer's identity via a meter number, for example, and the postage-paid indicium 30 applied to the mail piece 20, implementations of the current system are capable of processing automated charge assessment in association with mail pieces 20 bearing either no postage-paid indicium 30 or a postage-paid indicium 30 indicating insufficient postage without a pre-association between such indicia 30 and the identity of the postal customer to whom a postal charge is to be automatically assessed. Based on the preceding, non-limiting example, it will be readily appreciated that, in a typical implementation of the current invention, identification of one of a unique postal customer account and a unique postal meter account for purposes of automatically assessing a postal charge is not invariably dependent upon a pre-association, in computer memory, of one of a unique postal customer account and a unique postal meter account with a postage-paid indicium exhibited on the mail piece 20. In this aspect, among others, implementations of the present invention differ from systems that permit the downloading and printing of postage-paid indicia from a computer network, for example. In such "on-line" postage systems, each postage-paid indicium is separately identifiable and associated in computer memory with at least one of (i) a transaction identifier and (ii) a postal account number, either of which is associated with the identity of a postage purchaser.

Mail piece 20D is similar to mail piece 20B in that it is a metered letter to which insufficient postage—in this case 55 cents—has been applied. Accordingly, the postal-customer account database 175 is consulted to ascertain the identity of the sender associated with meter number 6689423. Referring to FIG. 5, meter number 6689423 is associated with the Beacon Hill Co. and a full mailing address appears in the record. Moreover, unlike the account associated with mail piece 20B, the account associated with meter number 6689423 is enabled for automated charge assessment. Accordingly, the deficiency of 23 cents is assessed to the account and mail piece 20D is routed for delivery as requested.

The foregoing is considered to be illustrative of the principles of the invention. Furthermore, since modifications and changes will occur to those skilled in the art without departing from the scope and spirit of the invention, it is to be understood that the foregoing does not limit the invention as expressed in the appended claims to the exact construction, implementations and versions shown and described.

What is claimed is:

1. A method of processing, through a postal system, a mail piece exhibiting at least a destination address field, information indicative of the identity of the sender and an indication as to a level of delivery service requested, the method comprising the steps of:

maintaining, in computer memory, postal-customer account data uniquely associating the identity of at least one postal customer with an account authorized to have automatically assessed to it postal charges associated with the processing of mail pieces for which one of (i) no postage-paid indicia and (ii) postage-paid indicia indicative of the payment of insufficient postage are exhibited thereon, including mail pieces exhibiting postage-paid indicia purchased without any pre-association in computer memory, prior to deposit of the mail piece into the postal system, between the authorized account and the postage-paid indicia exhibited on such mail pieces;

depositing into the postal system a mail piece exhibiting (i) a destination address field, (ii) information indicative of a sender whose identity is associated in the postal customer account data with an account authorized to have automatically assessed to it postal charges associated with the processing of mail pieces, (iii) an indication as to a level of delivery service requested and one of (a) no postage-paid indicium and (b) postage-paid indicia indicative of the payment of postage insufficient to process the mail piece in accordance with the level of delivery service requested and for which there existed in computer memory, at least prior to deposit of the mail piece into the postal system, no data associating the postage-paid indicia with an account to which postal charges can be automatically assessed;

capturing at least one image from a surface of the deposited mail piece and storing the at least one image in computer memory, the at least one image including at least (i) a destination address field image corresponding to the destination address field on the deposited mail piece, (ii) data indicative of the identity of the sender of the deposited mail piece, (iii) an indication as to a level of delivery service requested, and, to the extent that the deposited mail piece exhibits a postage-paid indicium, an image including data indicative of the postage-paid indicium;

maintaining mail-services postage data relating required postage rates to data indicative of a set of mail-piece characteristics;

resolving the at least one captured image associated with the deposited mail piece in order to produce a resolved data set associated with the deposited mail piece and indicative of (i) the destination indicated in the destination address field, (ii) the level of delivery service requested, (iii) whether any postage amount was paid, as evidenced by the exhibition on the mail piece of a postage-paid indicium and, if a post-paid indicium is in evidence, (iv) the amount of any postage paid;

consulting the mail-services postage data and comparing the resolved data set to the mail-services postage data;

rendering a determination, based on the comparison between the resolved data set associated with the deposited mail piece and the mail-services postage data, as to the deficiency in postage required to further process the mail piece in accordance with the level of delivery service requested;

resolving a portion of a captured image including data indicative of the identity of the sender of the deposited mail piece, associating the resolved data indicative of the identity of the sender with the resolved data set associated with the deposited mail piece, and comparing the resolved data set associated with the deposited mail piece to the postal-customer-account data in order to identify, through cross-referencing, the account with which the identity of the sender is associated;

automatically assessing to the account associated with the indicated sender a postal charge representative of at least the amount of the determined deficiency in postage required for the level of delivery service requested; and sorting the deposited mail piece for delivery in accordance with the level of delivery service requested.

2. The method of claim 1 wherein the assessed postal charge further includes a surcharge exacted for the deficiency.

* * * * *